US008313834B2

(12) United States Patent
Sato et al.

(10) Patent No.: US 8,313,834 B2
(45) Date of Patent: Nov. 20, 2012

(54) CORE FOR REACTORS COMPRISING PRESS-MOLDED METALLIC MAGNETIC PARTICLES, ITS MANUFACTURING METHOD, AND REACTOR

(75) Inventors: Atsushi Sato, Itami (JP); Toru Maeda, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 323 days.

(21) Appl. No.: 12/677,758

(22) PCT Filed: Sep. 10, 2008

(86) PCT No.: PCT/JP2008/002508

§ 371 (c)(1),
(2), (4) Date: Mar. 11, 2010

(87) PCT Pub. No.: WO2009/034710

PCT Pub. Date: Mar. 19, 2009

(65) Prior Publication Data

US 2010/0194516 A1 Aug. 5, 2010

(30) Foreign Application Priority Data

Sep. 11, 2007 (JP) ................................ 2007-235137

(51) Int. Cl.
*B32B 5/16* (2006.01)
*H01F 41/02* (2006.01)
*H01F 41/16* (2006.01)

(52) U.S. Cl. .......... 428/403; 148/27; 148/104; 148/105; 148/121; 148/300; 428/407; 428/900

(58) Field of Classification Search .......... 428/403–407; 148/27, 104, 105, 121, 300
See application file for complete search history.

(56) References Cited

U.S. PATENT DOCUMENTS 5,338,508 A * 8/1994 Nitta et al. .................... 420/120

(Continued)

FOREIGN PATENT DOCUMENTS

| | | |
|---|---|---|
| JP | 2001-102207 | 4/2001 |
| JP | 2004-319652 | 11/2004 |
| JP | 2006-202956 | 8/2006 |
| JP | 2006-283166 | 10/2006 |
| JP | 2007-129045 | 5/2007 |

OTHER PUBLICATIONS

European Search Report issued in European Patent Application No. 08830679.0-1215, mailed Nov. 29, 2010.

(Continued)

*Primary Examiner* — Hoa (Holly) Le
(74) *Attorney, Agent, or Firm* — McDermott Will & Emery LLP

(57) ABSTRACT

To provide a core for reactor capable of reducing the eddy current loss and improving the direct current superposition characteristics, a manufacturing method thereof, and a reactor. A core for reactor M is obtained by press molding metallic magnetic particles coated with an insulating coated film, and the metallic magnetic particles have the following compositions: (1) the mean particle size is 1 μm or more and 70 μm or less; (2) the variation coefficient Cv which is a ratio (σ/μ) of the standard deviation (σ) of the particle size and the mean particle size (μ) is 0.40 or less; and (3) the degree of circularity is 0.8 or more and 1.0 or less. On the outside of the insulating coated film, at least one of a heat-resistance imparting protective film and a flexible protective film is further provided as a outer coated film.

16 Claims, 1 Drawing Sheet

U.S. PATENT DOCUMENTS

| | | | | |
|---|---|---|---|---|
| 5,456,770 | A * | 10/1995 | Sato et al. | 148/304 |
| 5,643,352 | A * | 7/1997 | Werth | 75/255 |
| 6,063,209 | A * | 5/2000 | Matsutani et al. | 148/300 |
| 7,682,695 | B2 * | 3/2010 | Kugai et al. | 428/403 |
| 7,767,034 | B2 * | 8/2010 | Maeda et al. | 148/306 |
| 7,887,647 | B2 * | 2/2011 | Maeda et al. | 148/306 |
| 8,123,874 | B2 * | 2/2012 | Ishimine et al. | 148/306 |
| 2001/0016977 | A1 | 8/2001 | Moro et al. | |
| 2008/0152897 | A1 * | 6/2008 | Maeda et al. | 428/323 |
| 2008/0231409 | A1 * | 9/2008 | Kugai et al. | 336/233 |
| 2008/0248245 | A1 * | 10/2008 | Maeda et al. | 428/144 |
| 2008/0258102 | A1 * | 10/2008 | Hirose et al. | 252/62.51 R |
| 2010/0044618 | A1 * | 2/2010 | Ishimine et al. | 252/62.55 |

OTHER PUBLICATIONS

Japanese Office Action issued in Japanese Patent Application No. 2007-235137 dated Apr. 20, 2012.

* cited by examiner

CORE FOR REACTORS COMPRISING PRESS-MOLDED METALLIC MAGNETIC PARTICLES, ITS MANUFACTURING METHOD, AND REACTOR

RELATED APPLICATIONS

This application is the U.S. National Phase under 35 U.S.C. §371 of International Application No. PCT/JP2008/002508, filed on Sep. 10, 2008, which in turn claims the benefit of Japanese Application No. 2007-235137, filed on Sep. 11, 2007, the disclosures of which Applications are incorporated by reference herein.

TECHNICAL FIELD

The present invention relates to a core for reactor, a manufacturing method thereof, and a reactor. In particular, the present invention relates to a reactor effective for reducing eddy current loss.

BACKGROUND ART

In recent years, hybrid electric vehicles or electric vehicles have been put into practical use from the viewpoint of the global environment protection. The hybrid electric vehicles refer to vehicles that are provided with an engine and a motor as a driving source and that run using one or both of them. Such hybrid electric vehicles and the like are provided with a booster circuit in an electrical power distribution system for the motor. As one of components of the booster circuit, a reactor capable of storing electric energy as magnetic energy is utilized.

The reactor has a coil and a core, in which a closed magnetic circuit is formed in the core by excitation of the coil. As the core, a core constituted by a powder molded product is mentioned. The powder molded product is constituted by press molding multiple composite magnetic particles in which metallic magnetic particles are coated with an insulating coated film. When such a core is used in an alternating-current (AC) magnetic field, energy loss referred to as iron loss arises. The iron loss is generally indicated by the sum of hysteresis loss and eddy current loss. As a technique for reducing the eddy current loss among the above, the technique described in Patent Literature 1 is mentioned. Patent Literature 1 discloses specifying a ratio of the major diameter to Heywood diameter of multiple composite magnetic particles.

In contrast, a current waveform applied to the coil is a waveform in which alternating current components have been added to direct current components. When the direct current components among the above increase, the inductance of the coil decreases. As a result, the impedance decreases, causing problems in that the output decreases or the power conversion efficiency decreases. Therefore, in the reactor, it has been required that a reduction in inductance with an increase in the direct current components is low, i.e., direct current superposition characteristics are favorable. As a technique for improving the direct current superposition characteristics, the technique described in Patent Literature 2 is known. Patent Literature 2 discloses using nonregular-shaped soft magnetic powder having a particle size of 5 to 70 μm.

The powder molded product has been subjected to press molding in a manufacturing process thereof. However, defects, such as strain or dislocation, are introduced by deformation of the multiple composite magnetic particles during the press molding. Therefore, the magnetic coercive force of the powder molded product increases, causing a problem in that the hysteresis loss becomes large. As a measure therefore, it is effective to remove the strain or dislocation introduced into the multiple composite magnetic particles in the press molding process by heat treatment of the powder molded product to thereby facilitate the movement of a magnetic domain wall and reduce the magnetic coercive force of a magnetic core. When the heat treatment temperature is higher, the defects can be sufficiently removed. However, when the temperature is adjusted to an excessive high temperature, the insulating coated film decomposes or deteriorates, which increases the eddy current loss. As a technique for reducing damages to the insulating coated film during the press molding while suppressing the deterioration of the insulating coated film, the technique described in Patent Literature 3 is mentioned. Patent Literature 3 discloses providing a heat-resistance imparting protective film and a flexible protective film to the multiple composite magnetic particles.

Patent Literature 1: Japanese Unexamined Patent Application Publication No. 2007-129045

Patent Literature 2: Japanese Unexamined Patent Application Publication No. 2004-319652

Patent Literature 3: Japanese Unexamined Patent Application Publication No. 2006-202956

SUMMARY OF INVENTION

Technical Problem

However, former cores for reactor have been required to reduce the iron loss and further improve the direct current superposition characteristics.

In usual, the powder molded product is molded under a pressure as high as several hundred MPa. Therefore, in some cases, multiple composite magnetic particles are pressed against each other, so that the insulating coated film is damaged. When the insulating coated film is damaged, the eddy current loss of the molded product increases due to electrical bonding of the metallic magnetic particles. According to the technique of Patent Literature 1, the damages to the insulating coated film are suppressed by specifying the ratio of the maximum diameter to Heywood diameter of soft magnetic powder. However, it cannot be said that the damages are sufficiently suppressed by simply specifying the ratio.

Moreover, according to the technique described in Patent Literature 2, the particle size of the soft magnetic powder is simply limited, and thus the particle size of the powder varies within the limited range. Therefore, when such powder is molded, the uniformity inside the molded product decreases. Therefore, there remains room for improvement in the direct current superposition characteristics.

Further, according to the technique described in Patent Literature 3, the deterioration of the insulating coated film with the heat treatment of the powder molded product or the damages to the insulating coated film associated with the press molding can be suppressed. However, there is room for further improvement in the composition other than materials of the insulating coated film to from the viewpoint of suppression of the eddy current loss.

The present invention has been made in view of the above-described circumstances. It is an object of the invention to provide a core for reactor capable of reducing the eddy current loss and improving the direct current superposition characteristics and further suppressing the damages to the insulating coated film, a manufacturing method thereof, and a reactor.

Means for Solving the Problems

A core for reactor of the present invention is a core for reactor obtained by press molding metallic magnetic particles coated with an insulating coated film, in which the metallic magnetic particles has the following composition and further has an outer coated film surrounding the outside of the insulating coated film and the outer coated film has at least one of a heat-resistance imparting protective film and a flexible protective film:

(1) the mean particle size is 1 μm or more and 70 μm or less;

(2) the variation coefficient Cv which is a ratio (σ/μ) of the standard deviation (σ) of the particle size and the mean particle size (μ) is 0.40 or less; and (3) the degree of circularity is 0.8 or more and 1.0 or less.

A manufacturing method of a core for reactor of the present invention has the following processes:

(1) a process for preparing multiple composite magnetic particles in which an insulating coated film and a outer coated film are provided on metallic magnetic particles that satisfy the following requirements (A) to (C) and the outer coated film has at least one of a heat-resistance imparting protective film and a flexible protective film:

(A) the mean particle size is 1 μm or more and 70 μm or less;

(B) the variation coefficient Cv which is a ratio (σ/μ) of the standard deviation (σ) of the particle size and the mean particle size (μ) is 0.40 or less; and (C) the degree of circularity is 0.8 or more and 1.0 or less;

(2) a process for press molding the multiple composite magnetic particles to form into a specified shape of a core for reactor, and (3) a process for reducing defects introduced into the multiple composite magnetic particles during the press molding by heat treating the obtained molded product.

In the core for reactor of the present invention and the manufacturing method thereof, the degree of circularity is an average of values determined according to the following equation by observing the cross section of randomly selected 1000 or more metallic magnetic particles under a microscope, and calculating the area and the peripheral length of each metallic magnetic particle:

$$\text{Degree of circularity}=4\pi\times\text{Area of metallic magnetic particles}/(\text{Peripheral length of metallic magnetic particles})^2$$

According to these compositions, by the use of metallic particles having a fine mean particle size as multiple composite magnetic particles constituting a powder molded product, the thickness of the metallic magnetic particles insulated by the insulating coated film is subdivided, thereby reducing the eddy current loss. Moreover, by limiting the variation coefficient as described above, the distribution of the particle size of the metallic magnetic particles can be made uniform. Therefore, the uniformity inside the molded product obtained by press molding the multiple composite magnetic particles can be improved, and the movement of the magnetic domain wall can be facilitated in a magnetization process. As a result, the direct current superposition characteristics can be improved. Furthermore, by adjusting the degree of circularity of the metallic magnetic particles to 0.80 or more, strain generating in the surface of the metallic magnetic particles when the multiple composite magnetic particles are press molded can be reduced. Thus, the direct current superposition characteristics can be improved. Then, when the degree of circularity is adjusted to 0.80 or more, a molded product is constituted by metallic magnetic particles having a shape closer to a spherical shape. Therefore, when the multiple composite magnetic particles are press molded, damages to the insulating coated film due to that the particles are presses against each other can be suppressed. As a result, the eddy current loss can be reduced. The degree of circularity of 1.0 indicates that the particles have a spherical shape.

In contrast, when the outer coated film has a flexible protective film having given bending properties, the moldability becomes favorable. Since the flexible protective film bends, cracks are difficult to produce even when a pressure is applied to the film. Therefore, the flexible protective film can prevent the insulating coated film (When the heat-resistance imparting protective film is provided, a protective film thereof is mentioned.) from breaking due to the pressure during the press molding. In accordance therewith, the insulating coated film can be favorably operated to thereby reduce the eddy current loss. When the outer coated film has the heat-resistance imparting protective film, the insulating coated film is protected by the heat-resistance imparting protective film. Thus, the heat resistance of the insulating coated film improves, and thus the insulating coated film is difficult to break even when heat treated at high temperatures. As a result, the hysteresis loss can be reduced by heat treatment at high temperatures. It is a matter of course that when both the flexible protective film and the heat-resistance imparting protective film are provided, the effects of both of them can be obtained.

In the core for reactor of the present invention, it is preferable that the outer coated film have a mixed composition portion in which the compositions of the heat-resistance imparting protective film and the flexible protective film are mixed, that the components of the flexible protective film be contained in the surface side of the outer coated film in a higher proportion than that of the components of the heat-resistance imparting protective film, and that the components of the heat-resistance imparting protective film be contained in the boundary with the insulating coated film in a higher proportion than that of the components of the flexible protective film.

According to the composition, the components of the flexible protective film having given bending properties are present in a high proportion in the surface side of the multiple composite magnetic particles, and thus the moldability becomes favorable. Moreover, since the components of the flexible protective film are present in a high proportion in the surface side of the multiple composite magnetic particles, the flexible protective film can prevent the heat-resistance imparting protective film and the insulating coated film from breaking due to the pressure of the press molding. Therefore, the insulating coated film can be favorably operated to thereby sufficiently suppress the eddy current flowing between the metallic magnetic particles.

Moreover, since the components of the heat-resistance imparting protective film are present in a high proportion in the interface side with the insulating coated film, the heat-resistance imparting protective film protects the insulating coated film. Thus, the heat resistance of the insulating coated film improves, and thus even when the molded product is heat treated at high temperatures, the insulating coated film becomes difficult to break. Therefore, the hysteresis loss can be reduced by heat treatment at high temperatures.

In the core for reactor of the present invention, the mean particle size of the metallic magnetic particles is preferably 50 μm or more and 70 μm or less.

When the metallic magnetic particles have such a mean particle size, the effect of reducing the eddy current loss is obtained and also the handling of the multiple composite magnetic particles becomes easy and a molded product having a higher density can be obtained.

In the core for reactor of the present invention, it is preferable that the metallic magnetic particles substantially contain iron.

Iron is a preferable material in terms of magnetic permeability and magnetic flux density, and is inexpensive as compared with iron alloys and also excellent in economical efficiency. Pure iron containing Fe in a proportion of 99 mass % or more is particularly preferable.

It is mentioned in the core for reactor of the present invention that the insulating coated film contains at least one member selected from the group consisting of phosphorus compounds, silicon compounds, zirconium compounds, and aluminum compounds.

These substances are excellent in insulating properties, and thus the eddy current generating in the core can be more effectively suppressed.

It is mentioned in the core for reactor of the present invention that the average thickness of the insulating coated film is adjusted to 10 nm or more and 1 μm or less.

By limiting the film thickness of the insulating coated film as described above, shear fracture of the insulating coated film is prevented during the press molding and the eddy current loss can be effectively suppressed.

It is mentioned in the core for reactor of the present invention that the heat-resistance imparting protective film contains organic silicon compounds and the crosslink density of siloxane of the organic silicon compounds is more than 0 and 1.5 or less.

The organic silicon compounds having a crosslink density of siloxane of more than 0 and 1.5 or less are suitable as the heat-resistance imparting protective film because the compounds themselves have excellent heat resistance and also the content of Si is high even after thermal decomposition and, when changed to Si—O compounds, the shrinkage is low and the electric resistance does not sharply decrease. A more preferable crosslink density of siloxane (R/Si) is 1.3 or less.

It is mentioned in the core for reactor of the present invention that the flexible protective film contains a silicone resin and the content of Si in the outer coated film at the boundary with the insulating coated film is higher than the content of Si in the surface side of the outer coated film.

According to the composition, the flexible protective film is unevenly present in the surface of the outer coated film. Thus, the flexible protective film can prevent the heat-resistance imparting protective film and insulating coated film from breaking by the pressure of the press molding. Therefore, the insulating coated film is favorably operated to thereby sufficiently suppress the eddy current flowing between the metallic magnetic particles.

It is mentioned in the core for reactor of the present invention that the flexible protective film contains at least one member selected from the group consisting of silicone resins, epoxy resins, phenol resins, and amide resins.

The materials are suitable for the flexible protective film due to excellent flexibility and can effectively suppress the breakage of the insulating coated film.

It is mentioned in the core for reactor of the present invention that the average thickness of the outer coated film is 10 nm or more and 1 μm or less.

When the average thickness of the outer coated film is 10 nm or more, the breakage of the insulating coated film can be effectively suppressed. Moreover, when the average thickness of the outer coated film is 1 μm or less, it can be prevented that a diamagnetic field develops (development of energy loss due to the development of a magnetic pole in the metallic magnetic particles) due to that the distance between the metallic magnetic particles becomes excessively large. Thus, an increase in the hysteresis loss resulting from the development of the diamagnetic field can be suppressed. Moreover, it can be prevented that the saturation magnetic flux density of the molded product of the multiple composite magnetic particles decreases due to that the volume ratio of the outer coated film in the multiple composite magnetic particles becomes excessively low.

In contrast, a reactor of the present invention has the core for reactor described above and a coil formed by winding a winding wire around the core.

With the reactor having the composition, a reduction in the eddy current loss and an improvement of the direct current superposition characteristics can be achieved similarly as in the core for reactor described above.

Advantageous Effect of Invention

According to the core for reactor of the present invention and a manufacturing method thereof, the eddy current loss can be reduced and the direct current superposition characteristics can be improved. In particular, by providing the flexible protective film, the insulating coated film is prevented from being damaged by the pressure during the press molding of the multiple composite magnetic particles, and the eddy current loss can be reduced. Furthermore, by providing the heat-resistance imparting protective film, the decomposition or the like of the insulating coated film can be suppressed even when the heat treatment temperature of the molded product increases. Therefore, defects introduced when the multiple composite magnetic particles are press molded can be sufficiently removed and the hysteresis loss can be reduced.

REFERENCE NUMERALS

R reactor
M core
C coil
mu U-shaped core piece
mi I-shaped core piece
s spacer

DESCRIPTION OF THE PREFERRED EMBODIMENTS

Hereinafter, embodiments of the invention will be described.

<Reactor>

Figure 1:
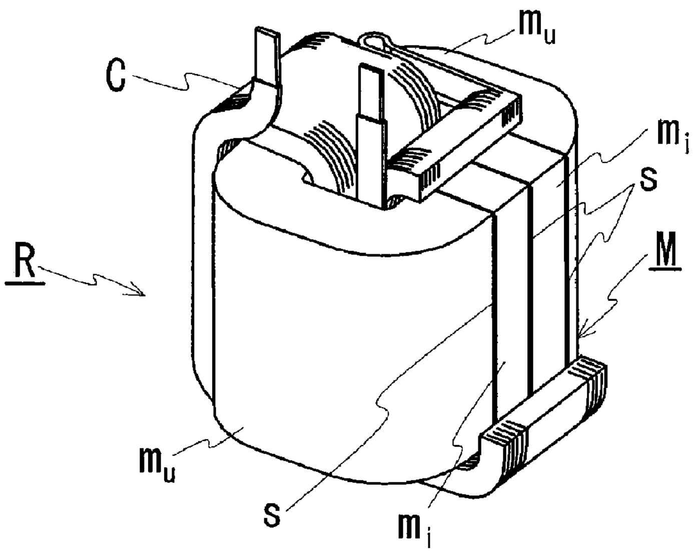
FIG. 1 is a partially cut perspective view illustrating an example of a reactor of the present invention.

The core of a typical reactor R for use in booster circuits of hybrid electric vehicles or the like is a ring-shaped core M as illustrated in FIG. 1. The core M is constituted by combining a plurality of the following core pieces. The core M is constituted by a pair of U-shaped core pieces mu having a rectangular shape and four I-shaped core pieces mi, in which the respective U-shaped core pieces mu are arranged so that the end surfaces of each of the U-shaped core pieces mu each other and two I-shaped core pieces mi are arranged between the end surfaces of each of the U-shaped core pieces mu, and then the core pieces are jointed to each other. The core M can be obtained by press molding metallic magnetic particles having an insulating coated film, i.e., multiple composite magnetic particles.

The core M is usually provided with gaps in a closed magnetic circuit by disposing a spacer s to each joint portion of the core pieces so as to avoid magnetic saturation. The inductance of the reactor is specified mainly by the total length (here the total thickness of the spacers s) of the gap formed in the closed magnetic circuit. For each spacer s, a plate material of a nonmagnetic material, such as alumina, is processed with high precision and utilized.

A coil C is formed by partially winding a winding wire around the core M. By passing a current through the coil C, the closed magnetic circuit is formed in the core M. For the winding wire, a copper wire coated with an insulating coated film of enamel or the like can be utilized. As the cross sectional shape of the winding wire, a round or a polygon is mentioned.

Although not illustrated, the core may be a so-called pot core. The pot core has a columnar inner core disposed inside the coil, a cylindrical outer core disposed on the outside of the coil, and a disc-like end core disposed on each of both ends of the coil, for example. When formed into the pot core, a reactor in which the coil is stored in the core is obtained. Therefore, the noise due to the oscillation associated with the excitation of the coil can be effectively suppressed or the coil can be mechanically protected. Furthermore, heat dissipation of the coil can be effectively performed.

[Core]

The multiple composite magnetic particles constituting the core described above refer to powder in which an insulating coated film and an outer coated film are formed on the surface of the metallic magnetic particles.

(Metallic Magnetic Particles)

The metallic magnetic particles preferably contain iron in a proportion of 50 mass % or more, and, for example, pure iron (Fe) is mentioned. In addition, metallic magnetic particles can be used which contain iron alloys, such as one member selected from iron (Fe)—silicon (Si) alloys, iron (Fe)—aluminum (Al) alloys, iron (Fe)—nitrogen (N) alloys, iron (Fe)—nickel (Ni) alloys, iron (Fe)—carbon (C) alloys, iron (Fe)—boron (B) alloys, iron (Fe)—cobalt (Co) alloys, iron (Fe)—phosphorus (P) alloys, iron (Fe)—nickel (Ni)—cobalt (Co) alloys, and iron (Fe)—aluminum (Al)—silicon (Si), for example. In particular, pure iron containing Fe in a proportion of 99 mass % or more is preferable in terms of magnetic permeability and magnetic flux density. The pure iron is inexpensive as compared with iron alloys and is also excellent in economical efficiency.

The mean particle size of the metallic magnetic particles is 1 μm or more and 70 μm or less. By adjusting the mean particle size of the metallic magnetic particles to 1 μm or more, an increase in the magnetic coercive force and hysteresis loss of a powder magnetic core produced using the multiple composite magnetic particles can be suppressed while not reducing the fluidity of the multiple composite magnetic particles. In contrast, by adjusting the mean particle size of the metallic magnetic particles is adjusted to 70 μm or less, the eddy current loss generating in a high frequency area of 1 kHz or higher can be effectively reduced. The mean particle size of the metallic magnetic particles is more preferably 50 μm or more and 70 μm or less. When the lower limit of the mean particle size is 50 μm or more, the effect of reducing the eddy current loss is obtained and also the handling of the multiple composite magnetic particles is facilitated and a molded product having a higher density can be obtained. The mean particle size refers to a particle size of particles in which the sum of the mass of particles from particles having a smaller particle size reaches 50% of the total mass in the histogram of the particle size, i.e., 50 percent particle diameter.

In the metallic magnetic particles, the variation coefficient Cv (σ/μ) which is a ratio of the standard deviation (σ) of the particle size and the mean particle size (μ) is adjusted to 0.40 or less. By adjusting the variation coefficient Cv to 0.40 or less, the distribution of the particle size of the metallic magnetic particles can be made uniform. Therefore, the uniformity inside a molded product produced using the multiple composite magnetic particles can be improved. As a result, since the movement of a magnetic domain wall can be facilitated in a magnetization process of the core, the direct current superposition characteristics can be improved. The variation coefficient Cv is more preferably 0.38 or less and still more preferably 0.36 or less. The variation coefficient Cv is preferably smaller, but the lower limit is about 0.001 or more from the viewpoint of ease of production.

The metallic magnetic particles are formed into a shape having a degree of circularity of 0.80 or more and 1 or less. By adjusting the degree of circularity to 0.80 or more, strain generating in the surface of the metallic magnetic particles during the press molding of the multiple composite magnetic particles can be reduced. Thus, the direct current superposition characteristics can be improved. When the degree of circularity is 0.80 or more, a shape having few acute projections and being close to a spherical shape is obtained. Thus, damages to the insulating coated film when the particles are pressed against each other during the press molding of the multiple composite magnetic particles are suppressed. As a result, insulation between the metallic magnetic particles can be more surely held, thereby reducing the eddy current loss. In particular, the degree of circularity is preferably 0.91 or more. When the outer shape of the metallic magnetic particles is a spherical shape, the degree of circularity of the metallic magnetic particles is 1.0.

(Insulating Coated Film)

The insulating coated film functions as an insulating layer between the metallic magnetic particles. By coating the metallic magnetic particles with the insulating coated film, contact between the metallic magnetic particles can be suppressed to thereby suppress the relative magnetic permeability of a molded product. Due to the presence of the insulating coated film, flowing of the eddy current between the metallic magnetic particles is suppressed to thereby reduce the eddy current loss of the molded product. For the insulating coated film, a material containing at least one member selected from the group consisting of phosphorus compounds, silicon compounds, zirconium compounds, and aluminum compounds can be preferably used. Since these substances are excellent in insulation, flowing of the eddy current between the metallic magnetic particles can be effectively suppressed. Specific examples include iron phosphates, manganese phosphates, zinc phosphates, calcium phosphates, silicon oxides, and zirconium oxides. For the insulating coated film, insulating materials, such as metal oxides, metal nitrides, metal carbides, metal phosphate compounds, metal borate compounds, or metal silicate compounds, can be used. For the metals here, at least one member selected from Fe, Al, Ca, Mn, Zn, Mg, V, Cr, Y, Ba, Sr, rare earth elements, etc. The insulating coated film containing such materials may be a single or multilayer film.

The thickness of the insulating coated film is preferably 10 nm or more and 1 μm or less. By adjusting the thickness of the insulating coated film to 10 nm or more, contact between the metallic magnetic particles can be suppressed or energy loss due to eddy current can be effectively suppressed. By adjusting the thickness of the insulating coated film to 1 μm or less, the proportion of the insulating coated film in the multiple composite magnetic particles does not become excessively high. Therefore, the magnetic flux density of the multiple composite magnetic particles can be prevented from sharply decreasing. When the particle size of the multiple composite magnetic particles is smaller, the thickness of the insulating coated film tends to be smaller.

The thickness of the insulating coated film is an average thickness determined by deriving an appropriate thickness in view of the film composition obtained by composition analysis (TEM-EDX: transmission electron microscope energy dispersive X-ray spectroscopy) and the amount of elements obtained by inductively coupled plasma-mass spectrometry (ICP-MS: inductively coupled plasma-mass spectrometry), and confirming that the derived appropriate thickness is a proper value by directly observing the coated film using a TEM photograph.

(Outer Coated Film)

For a specific composition or a film formation method of the outer coated film, the composition or the method described in Japanese Unexamined Patent Application Publication No. 2006-202956 can be utilized.

<Heat-Resistance Imparting Protective Film>

The heat-resistance imparting protective film functions for preventing thermal decomposition of a lower insulating coated film when heated during heat treatment of a molded product. Therefore, the heat-resistance imparting protective film is preferably formed right above the insulating coated film. As materials for the heat-resistance imparting protective film, materials containing organic silicon compounds and having a crosslink density of siloxane (R/Si) of 0 or more and 1.5 or less are mentioned. Here, the crosslink density of siloxane (R/Si) is a numerical value indicating the average number of organic groups bonded to one Si atom. When the value is smaller, the degree of crosslinking becomes high and the content of Si elements becomes high.

<Flexible Protective Film>

The flexible protective film functions for preventing the lower layer heat-resistance imparting protective film or the insulating coated film from breaking during the press molding of the multiple composite magnetic particles. Therefore, the flexible protective film is preferably formed right above the heat-resistance imparting protective film or the insulating coated film. It is a matter of course that the flexible protective film and the heat-resistance imparting protective film may be successively formed on the insulating coated film. The flexible protective film contains a silicone resin having a crosslink density of siloxane (R/Si) of more than 1.5, for example. In addition, the flexible protective film may contain an epoxy resin, a phenol resin, or amide resin.

Such a flexible protective film contains materials having given bending properties. Specifically, the flexible protective film contains materials that protect a coated film from cracking and that are not separated from a metal plate when a bending test specified in JIS is performed at room temperature using a round bar having a diameter of 6 mm. The bending test is performed by the following method. Test pieces are placed inside a room for 24 hours in the case of air drying varnish and are additionally heated at a specified temperature for a specified period of time in the case of heat drying varnish. Thereafter, the test pieces are allowed to cool at room temperature. Then, metal-plate test pieces are held in water of 25±5° C. for about 2 minutes, and are bent to an angle of 180° in about 3 seconds along a round bar having a given diameter with a coated film outside while maintaining the state. Then, the test pieces are visually inspected whether cracks are formed in the coating film or the coated film is separated from the metal plate.

Mixed Composition Portion>

The heat-resistance imparting protective film and the flexible protective film preferably contain a mixed composition portion in which the composition successively changes in the thickness direction. As a method for forming the outer coated film having a mixed composition portion on the surface of the insulating coated film, a method including immersing the metallic magnetic particles on which the insulating coated film has been formed in an organic solvent in which components of the heat-resistance imparting protective film has been dissolved, stirring the resultant, and evaporating the organic solvent while gradually dissolving the components of the flexible protective film in the organic solvent is mentioned, for example. According to the method, the components of the heat-resistance imparting protective film coat the surface of the insulating coated film first, and the proportion of the components of the heat-resistance imparting protective film decreases in the organic solvent. In contrast, the components of the flexible protective film increase in the organic solvent, and an outer coated film in which the components of the flexible protective film have gradually increased is obtained.

[Manufacturing Method of Core]

(Preliminary Process)

First, in a preliminary process, metallic magnetic particles having the mean particle size, variation coefficient, and degree of circularity described above are prepared. In order to change the variation coefficient of the metallic magnetic particles, variation in the particle size is reduced by classifying the metallic magnetic particles using a sieve. In order to obtain metallic magnetic particles having a degree of circularity of 0.8 or more, in the case of producing the metallic magnetic particles by an atomization process, a cooling rate when a sprayed metal solidifies is reduced, for example. As powder generated by the atomization process, powder generated by a gas atomization process and powder generated by a water atomization process are mentioned. Among the above, the former refers to almost spherical particles and the latter refers to nonspherical particles having irregularities formed on the surface. However, even in the case of the metallic magnetic particles generated by the water atomization process, the degree of circularity of 0.8 or more can be obtained by crushing the particles using a ball mill or the like to form into a spherical shape.

The above-described given metallic magnetic particles are preferably subjected to preliminary heat treatment at a temperature of 700° C. or more and 1400° C. or less before the formation of the insulating coated film. The metallic magnetic particles have a large number of defects, such as strain or a crystal grain boundary resulting from thermal stress during the atomization treatment or the like. Therefore, these defects can be reduced by carrying out the above-described preliminary heat treatment. The preliminary heat treatment may be omitted.

An insulating coated film is formed on the obtained metallic magnetic particles. As a typical example of a method for forming the insulating coated film, phosphate chemical conversion treatment is mentioned. In addition, a sol-gel process using solvent spraying or a precursor can also be used. The insulating coated film of a silicon organic compound may be formed utilizing a wet coating process using an organic solvent, a direct coating process by a mixer, etc. In addition, thermoplastic resins, non-thermoplastic resins, higher fatty acid salts, or the like can be used as the insulating coated film.

When metallic magnetic particles in commercial multiple composite magnetic particles satisfy the mean particle size, the variation coefficient, and the degree of circularity described above, it is a matter of course that the commercial item can be used.

Then, the outer coated film is formed on the surface of the insulating coated film. When the outer coated film is the heat-resistance imparting protective film, as a method for forming the heat-resistance imparting protective film on the surface of the insulating coated film, a method including immersing the metallic magnetic particles on which the insulating coated film has been formed in an organic solvent in which the components of the heat-resistance imparting protective film have been dissolved, stirring the resultant, and evaporating the organic solvent, and then curing the heat-resistance imparting protective film (wet coating process) is mentioned, for example.

The above-described wet coating process can also be similarly used as a method for forming the flexible protective film on the surface of the heat-resistance imparting protective film.

(Formation Process)

In order to manufacture a core, the multiple composite magnetic particles are molded into a desired shape. The molding is performed by charging the multiple composite magnetic particles in a desired metal mold, and pressing the same using a punch. The pressure during the pressing is preferably 390 MPa or more and 1500 MPa or less. When the pressure is less than 390 MPa, the compression degree is low, and thus the core density is likely to decrease. When the pressure exceeds 1500 MPa, the insulating coated film may be damaged due to contact of powder. The pressure during the pressing is more preferably 700 MPa or more and 1300 MPa or less. The atmosphere during the molding is preferably an inert gas atmosphere, such as Ar, or a reduced-pressure atmosphere in order to prevent oxidation of the multiple composite magnetic particles by oxygen in the air.

It is preferable to use lubricants as appropriate during the molding. The lubricants contribute to improving the fluidity of the multiple composite magnetic particles to thereby obtain a high-density molded product or avoiding strong rubbing of the multiple composite magnetic particles to thereby suppress damages to the insulating coated film and also suppress the eddy current loss. Specific examples of the lubricants include at least one of metal soaps and inorganic lubricants having a crystal structure of a hexagonal system.

The additive amount of the lubricants is preferably 0.001 mass % or more and 0.2 mass % or less relative to the multiple composite magnetic particles. When the additive amount is adjusted to 0.001 mass % or more, the fluidity of the multiple composite magnetic particles can be improved due to high lubrication properties of the metal soaps and the inorganic lubricants having a crystal structure of a hexagonal system. Therefore, the charging properties of the multiple composite magnetic particles when charged into a metal mold can be improved. As a result, the density of the molded product to be obtained can be improved, and therefore the direct current superposition characteristics can be improved. By adjusting the additive amount to 0.2 mass % or less, a reduction in the density of the molded product can be suppressed, and therefore the deterioration of the direct current superposition characteristics can be prevented.

The mean particle size of the lubricants is preferably 2.0 μm or less. By adjusting the mean particle size of the lubricants to 2.0 μm or less, damages to the insulating coated film when the multiple composite magnetic particles are press molded can be further reduced, and thus the iron loss can be further reduced. The mean particle size refers to a particle size of particles in which the sum of the mass of particles from particles having a smaller particle size reaches 50% of the total mass in the histogram of the particle size, i.e., 50 percent particle diameter.

Then, the multiple composite magnetic particles are mixed with the lubricants to be used as a mixed material. The mixing method is not particularly limited, and a vibrating ball mill, a planetary ball mill, etc., can be preferably used. It is a matter of course that resins or other additives may be mixed as required.

(Heat Treatment Process)

The obtained molded product is heat treated to remove defects, such as strain introduced into the multiple composite magnetic particles by molding, thereby improving the hysteresis loss. It is preferable that the temperature of the heat treatment be higher because the hysteresis loss can be reduced. However, according to the thermal decomposition temperature of materials for the insulating coated film, temperatures lower than the thermal decomposition temperature are selected. In usual, when the insulating coated film is an amorphous phosphate coating, such as iron phosphates or zinc phosphates, the heat treatment temperature is at most 500° C. In contrast, when the insulating coated film is an insulating coated film containing metal oxides or the like and having a high heat resistance, the heat treatment temperature is preferably 550° C. or more, particularly preferably 600° C. or more, and still more preferably 650° C. or more. The retention time is, for example, 30 minutes or more and 60 minutes or less. The heating temperature or the retention time may be changed according to the type of the insulating coated film.

[Insulator]

In addition, an insulator may be disposed between the core for reactor of the present invention and the coil. By the use of the insulator, even when the insulating coated film of a winding wire forming the coil is damaged, the insulation between the coil and the core can be secured. The insulator can be constituted by injection molding resins beforehand.

EXAMPLE 1

(Production of Core)

Core for reactor samples were produced by a process including: preparation of metallic magnetic particles→formation of an insulating coated film and a outer coated film→mixing of multiple composite magnetic particles and additives→molding of a mixed material→heat treatment of a molded product.

<Sample No. 1>

First, metallic magnetic particles containing iron in a proportion of 99.8 mass % or more and the balance being 0.2 mass % or less of O and 0.1 mass % or less of inevitable impurities, such as C, N, P, or Mn, were prepared as metallic magnetic particles by subjecting iron powder to a water atomization process. The variation in the particle size of the metallic magnetic particles was adjusted by classification using a sieve. The mean particle size of the obtained metallic magnetic particles was 65 μm, the variation coefficient Cv thereof was 0.36, and the degree of circularity Sf thereof was 0.92.

The mean particle size and the variation coefficient Cv of the metallic magnetic particles were calculated by measuring the particle size distribution of a target powder using a laser diffraction/scattering particle size distribution measuring method. The degree of circularity Sf was determined as follows. First, a large number of metallic magnetic particles are hardened by a resin, and a solidified item thereof is polished to form a cross section. Next, the cross section was observed with an optical microscope, and an observation image containing 1000 or more randomly extracted metallic magnetic particles was obtained. Then, image processing of the observation image was carried out to specify the cross sectional shape of the metallic magnetic particles, the area and the peripheral length of each metallic magnetic particle were calculated, and an average value of values determined by the following equation was used.

$$\text{Degree of circularity} = 4\pi \times \text{Area of metallic magnetic particles} / (\text{Peripheral length of metallic magnetic particles})^2$$

Next, the metallic magnetic particles were subjected to phosphate chemical conversion treatment to form an insulating coated film containing an iron phosphate, thereby obtaining multiple composite magnetic particles. The average thickness of the insulating coated film was 50 nm.

Next, a coated film of a low-molecular silicone resin (XC96-B0446, manufactured by GE Toshiba Silicones Co., Ltd.) having a crosslink density of siloxane (R/Si) of 1.3 or less was formed with a film thickness of 50 nm as a heat-resistance imparting protective film on the insulating coated film. Furthermore, a coated film of a high molecular silicone resin (TSR116, manufactured by GE Toshiba Silicones Co., Ltd.) having a crosslink density of siloxane (R/Si) of 1.5 or more was formed thereon with a film thickness of 50 nm as a flexible protective film. Thereafter, the resultant was held at a temperature of 150° C. in the air for 1 hour for heat curing the heat-resistance imparting protective film and the flexible protective film, thereby obtaining multiple composite magnetic particles.

Subsequently, 0.005 mass % of zinc stearate having a mean particle size of 1 μm was added as a metal soap to the composite metal particles, and mixed. Then, the mixed material was charged in a metal mold, and a pressure of 1000 MPa was applied thereto, thereby producing a molded product. Subsequently, the obtained molded product was placed in a nitrogen flow atmosphere, and heat treated at 500° C. for 1 hour, thereby producing a core for reactor serving as Invention 1. For Invention 1, the degree of circularity of the metallic magnetic particles after molding was also analyzed by observing the cross section of the molded product using an optical microscope, and the degree of circularity thereof was 0.85.

<Sample No. 2>

Invention 2 was produced having the same composition as that of Invention 1, except that the outer coated film was only a heat-resistance imparting protective film. The film thickness of the heat-resistance imparting protective film is 100 nm.

<Sample No. 3>

Invention 3 was produced having the same composition as that of Invention 1, except that the outer coated film was only a flexible protective film. The film thickness of the flexible protective film is 100 nm.

<Sample No. 4>

Invention 4 was produced having the same composition as that of Invention 1, except that a lubricant (metal soap) was not used.

<Samples No. 5 to No. 7>

Inventions 5 to 7 were produced having the same composition as that of Invention 1, except that at least one of the mean particle size, variation coefficient Cv, and degree of circularity Sf of metallic magnetic particles is different.

<Sample No. 11>

A comparative item 1 was produced having the same composition as that of Invention 1, except that an outer coated film was not provided.

<Samples No. 12 to No. 15>

Comparative items 12 to 15 were produced having the same composition as that of Invention 1, except that at least one of the mean particle size, variation coefficient Cv, and degree of circularity Sf of metallic magnetic particles is different.

(Evaluation Method)

The core of each of the obtained samples was measured for the direct current superposition characteristics, iron loss, hysteresis loss, and eddy current loss.

Figure 2:
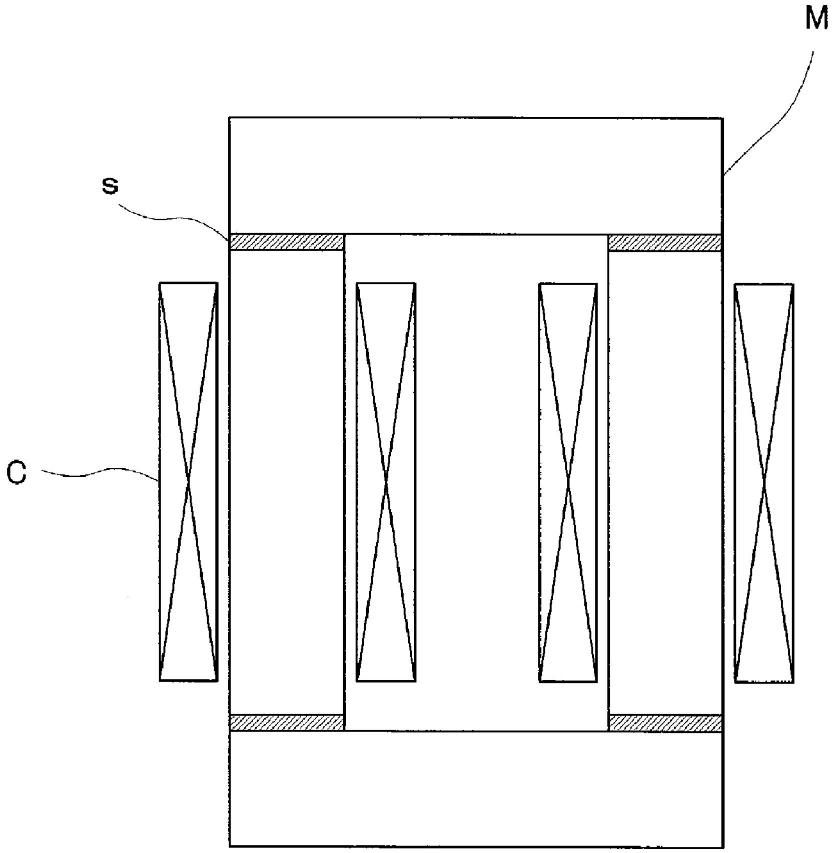
FIG. 2 is an explanatory view of a test method of direct current superposition characteristics.

Specifically, the direct current superposition characteristics were measured by combining the core M containing each sample and spacers s and forming a Coil C around the core M as illustrated in FIG. 2 using a direct current superposition test machine. Here, the direct current superposition characteristics were evaluated based on a ratio (L20A/L0A) (unit:none) of an inductance L20A when an applied current was 20 A to an inductance LOA when an applied current is 0 A. When the ratio is larger, a reduction in the inductance is low, and the direct current superposition characteristics are excellent.

A winding wire was wound (primary winding of 300 turns and secondary winding of 20 turns) around each ring-shaped sample (heat treated) having an outer diameter of 34 mm, an inner diameter of 20 mm, and a thickness of 5 mm, and the resultants were used as samples for measuring the magnetic properties. These samples were measured for the iron loss using an AC-BH curve tracer at an excitation magnetic flux density of 1 kG (=0.1 T (Tesla)) while changing the frequency in the range of 50 Hz to 10000 Hz. Then, the hysteresis loss and the eddy current loss were calculated from the iron loss. The results are also shown in Table I. The hysteresis loss and the eddy current loss were calculated by fitting the frequency curve of the iron loss according to the following three equations based on the least-squares method.

$$(\text{Iron loss}) = (\text{Hysteresis loss coefficient}) \times (\text{Frequency}) + (\text{Eddy current loss coefficient}) \times (\text{Frequency})^2$$

$$(\text{Hysteresis loss}) = (\text{Hysteresis loss coefficient}) \times (\text{Frequency})$$

$$(\text{Eddy current loss}) = (\text{Eddy current loss coefficient}) \times (\text{Frequency})^2$$

In addition, with respect to the samples No. 1 and No. 4, the density and resistance of the obtained molded products were analyzed. With respect to the samples No. 1 to No. 3, cores were also produced while changing the heat treatment temperature of the molded products in the range of 500 to 800° C., and the iron loss thereof was measured. The results are shown in Table II.

TABLE I

| Sample No. | Metallic magnetic particles: Mean particle size (μm) | Variation coefficient Cv | Degree of circularity Sf | Coated film | Iron loss (W1/10k) (W/kg) | Hysteresis loss (W/kg) | Eddy current loss (W/kg) | Direct current superposition characteristics $L_{20A}/L_{0A}$ |
|---|---|---|---|---|---|---|---|---|
| 1 | 65 | 0.36 | 0.92 | Insulating coated film + Heat-resistance imparting protective film + Flexible | 17.8 | 14.2 | 3.6 | 0.894 |
| 2 | 65 | 0.36 | 0.92 | Insulating coated film + Heat-resistance imparting protective film | 18.6 | 15.0 | 3.6 | 0.875 |

TABLE I-continued

| | Metallic magnetic particles | | | | | | Eddy | Direct current |
|---|---|---|---|---|---|---|---|---|
| Sample No. | Mean particle size (μm) | Variation coefficient Cv | Degree of circularity Sf | Coated film | Iron loss (W1/10k) (W/kg) | Hysteresis loss (W/kg) | current loss (W/kg) | superposition characteristics $L_{20A}/L_{0A}$ |
| 3 | 65 | 0.36 | 0.92 | Insulating coated film + Flexible protective film | 22.0 | 18.5 | 3.5 | 0.803 |
| 4 | 65 | 0.36 | 0.92 | Insulating coated film + Heat-resistance imparting protective film + Flexible | 18.0 | 14.5 | 3.6 | 0.883 |
| 5 | 40 | 0.40 | 0.80 | Insulating coated film + Heat-resistance imparting protective film + Flexible | 18.3 | 14.9 | 3.4 | 0.858 |
| 6 | 50 | 0.38 | 0.91 | Insulating coated film + Heat-resistance imparting protective film + Flexible | 17.6 | 14.2 | 3.4 | 0.917 |
| 7 | 70 | 0.36 | 0.92 | Insulating coated film + Heat-resistance imparting protective film + Flexible | 17.8 | 14.1 | 3.7 | 0.900 |
| 11 | 65 | 0.36 | 0.92 | Insulating coated film* | 22.5 | 18.8 | 3.7 | 0.771 |
| 12 | 75※ | 0.37 | 0.91 | Insulating coated film + Heat-resistance imparting protective film + Flexible | 18.0 | 14.2 | 3.8 | 0.908 |
| 13 | 100※ | 0.36 | 0.92 | Insulating coated film + Heat-resistance imparting protective film + Flexible | 25.5 | 14.0 | 11.5 | 0.892 |
| 14 | 70 | 0.45※ | 0.90 | Insulating coated film + Heat-resistance imparting protective film + Flexible | 18.1 | 14.3 | 3.8 | 0.867 |
| 15 | 70 | 0.37 | 0.75※ | Insulating coated film + Heat-resistance imparting protective film + Flexible | 19.2 | 15.0 | 4.2 | 0.883 |

※Outside the scope of the present invention

TABLE II

| Heat treatment | Iron loss (W/kg) | | |
|---|---|---|---|
| temperature (° C.) | Invention 1 | Invention 2 | Invention 3 |
| 500 | 17.8 | 18.6 | 22.0 |
| 600 | 17.5 | 18.0 | 19.7 |
| 700 | 17.0 | 17.6 | 23.8 |
| 800 | 21.1 | 22.3 | Unmeasurable |

(Evaluation Results)

As illustrated in Table I, the comparison of the sample Nos. 1, 5 to 7, 12, and 13 shows that the eddy current loss of the samples in which the mean particle size of the metallic magnetic particles is 50 to 70 μm becomes low. Moreover, the comparison of the samples Nos. 1, 7, and 14 shows that, in the samples having a low variation coefficient Cv, a reduction in the inductance is low and the direct current superposition characteristics are excellent. Furthermore, the comparison of the samples Nos. 1, 7, and 15 shows that when the degree of circularity Sf is larger, the hysteresis loss and eddy current loss can be suppressed. With respect to the sample No. 1, the density and resistance of the molded product were 7.38 g/cm$^3$ and 1950 μΩm, respectively. In contrast, the density and resistance of the molded product of the sample No. 4 were 7.33 g/cm$^3$ and 1800 μΩm, respectively. This has revealed that when lubricants are applied, molded products having a high density and a low iron loss are obtained.

As illustrated in Table II, when the heat treatment temperature was 700° C., the iron loss W1/10k of Invention 1 was 17.0 W/kg and, in contrast, the iron loss of Invention 2 was 17.6 W/kg and the iron loss of Invention 3 was 23.8 W/kg. At other heat treatment temperatures, the iron loss of Invention 1 was less than that of each of Inventions 2 and 3.

Moreover, also in Inventions 1 to 3, the value of the iron loss has a minimum value. When the heat treatment temperature exceeds a given temperature, the iron loss increases. This is because the thermal decomposition of the insulating coated film is initiated by the heat treatment, which increases the eddy current loss. A temperature at which the value of the iron loss becomes the minimum value is 700 to 750° C. in the case of Invention 1, 700° C. in the case of Invention 2, and 600° C. in the case of Invention 3. The above results have revealed that the insulating coated films of Inventions 1 and 2 having the heat-resistance imparting protective film have a high heat resistance and that Inventions 1 and 2 can sufficiently suppress the iron loss (eddy current and hysteresis loss).

As described above, it has been confirmed that when the mean particle size of the metallic magnetic particles is 50 to 70 μm, the variation coefficient Cv is 0.40 or less, the degree of circularity Sf was 0.8 or more, and at least one of the heat-resistance imparting protective film and the flexible protective film is provided as the outer coated film, the iron loss can be reduced and the direct current superposition characteristics can be improved.

The present invention can be changed as appropriate without deviating from the gist, and is not limited to the Examples above.

INDUSTRIAL APPLICABILITY

The core for reactor and the reactor of the present invention can be preferably used as components of reactors for booster circuits of hybrid electric vehicles or power generation and transformation facilities.

The invention claimed is:

1. A core for a reactor obtained by press molding metallic magnetic particles, wherein:

the metallic magnetic particles are coated with an insulating coated film, the metallic magnetic particles have:

a mean particle size of 50 μm or more and 70 μm or less;

a variation coefficient Cv which is a ratio (σ/μ) of a standard deviation (σ) of a particle size and a mean particle size (μ) of 0.40 or less; and a degree of circularity of 0.8 or more and 1.0 or less, the metallic magnetic particles have an outer coated film surrounding the outside of the insulating coated film, the outer coated film has at least one of a heat-resistance imparting protective film and a flexible protective film, the metallic magnetic particles substantially contain iron and inevitable impurities, an amount of the inevitable impurities being 0.1 wt % or less, the degree of circularity is an average of values determined according to the following equation by observing the cross section of randomly selected 1000 or more metallic magnetic particles under a microscope, and calculating the area and the peripheral length of each metallic magnetic particle, and the degree of circularity=4π×Area of metallic magnetic particles/(Peripheral length of metallic magnetic particles)$^2$.

2. The core for a reactor according to claim 1, wherein:

the outer coated film has a mixed composition portion in which components of the heat-resistance imparting protective film and components of the flexible protective film are mixed, the components of the flexible protective film are contained in the surface side of the outer coated film in a higher proportion than that of the components of the heat-resistance imparting protective film, and the components of the heat-resistance imparting protective film are contained in a boundary with the insulating coated film in a higher proportion than that of the components of the flexible protective film.

3. The core for a reactor according to claim 2, wherein the heat-resistance imparting protective film contains an organic silicon compound and the crosslink density of siloxane of the organic silicon compound is more than 0 and 1.5 or less.

4. The core for a reactor according to claim 2, wherein the flexible protective film contains at least one member selected from the group consisting of silicone resins, epoxy resins, phenol resins, and amide resins.

5. The core for a reactor according to claim 1 or 2, wherein the insulating coated film contains at least one member selected from the group consisting of phosphorus compounds, silicon compounds, zirconium compounds, and aluminum compounds.

6. The core for a reactor according to claim 1 or 2, wherein the average thickness of the insulating coated film is 10 nm or more and 1 μm or less.

7. The core for a reactor according to claim 1 or 2, wherein the average thickness of the outer coated film is 10 nm or more and 1 μm or less.

8. A reactor comprising:

the core for reactor according to claim 1 or claim 2; and a coil formed by winding a winding wire around the core.

9. The core for a reactor according to claim 1, wherein the heat-resistance imparting protective film contains an organic silicon compound and the crosslink density of siloxane of the organic silicon compound is more than 0 and 1.5 or less.

10. The core for a reactor according to claim 1, wherein the flexible protective film contains at least one member selected from the group consisting of silicone resins, epoxy resins, phenol resins, and amide resins.

11. The core for a reactor according to claim 1, wherein the flexible protective film contains a silicone resin and the content of Si in the outer coated film at the boundary with the insulating coated film is higher than the content of Si in the surface side of the outer coated film.

12. The core for a reactor according to claim 1, wherein the inevitable impurities include C, N, P, or Mn

13. The core for a reactor according to claim 1, wherein the metallic magnetic particles contain the iron 99 wt % or more.

14. A manufacturing method of a core for a reactor, the method comprising steps of:

preparing multiple composite magnetic particles in which an insulating coated film and a outer coated film containing at least one of a heat-resistance imparting protective film and a flexible protective film are formed on metallic magnetic particles having a mean particle size of 50 μm or more and 70 μm or less, a variation coefficient Cv which is a ratio (σ/μ) of a standard deviation (σ) of a particle size and a mean particle size (μ)of 0.40 or less, and a degree of circularity of 0.8 or more and 1.0 or less, the metallic magnetic particles substantially containing iron and inevitable impurities, an amount of the inevitable impurities being 0.1 wt % or less;

press molding the multiple composite magnetic particles to form into a specified shape of a core for reactor, and reducing defects introduced into the multiple composite magnetic particles during the press molding by heat treating the obtained molded product, wherein:

the degree of circularity being an average of values determined according to the following equation by observing the cross section of randomly selected 1000 or more metallic magnetic particles under a microscope, and calculating the area and the peripheral length of each metallic magnetic particle, and the degree of circularity=4π×Area of metallic magnetic particles/(Peripheral length of metallic magnetic particles)$^2$.

15. The manufacturing method of claim 14, wherein the inevitable impurities include C, N, P, or Mn.

16. The manufacturing method of claim 14, wherein the metallic magnetic particles contain the iron 99 wt % or more.

* * * * *